(No Model.)

H. K. JONES.
FELLY SCREW.

No. 448,347. Patented Mar. 17, 1891.

Witnesses.
John Edwards Jr.
H. H. Whiting.

Inventor.
Horace K. Jones,
By James Shepard
Atty.

UNITED STATES PATENT OFFICE.

HORACE K. JONES, OF HARTFORD, ASSIGNOR TO THE RUSSELL & ERWIN MANUFACTURING COMPANY, OF NEW BRITAIN, CONNECTICUT.

FELLY-SCREW.

SPECIFICATION forming part of Letters Patent No. 448,347, dated March 17, 1891.

Application filed December 8, 1890. Serial No. 373,881. (No model.)

*To all whom it may concern:*

Be it known that I, HORACE K. JONES, a citizen of the United States, residing at Hartford, in the county of Hartford and State of Connecticut, have invented certain new and useful Improvements in Felly - Screws, of which the following is a specification.

My invention relates to improvements in screws of the class which are designed for use in fellies or analogous pieces of wood to prevent the wood from splitting instead of for holding two pieces together; and the chief object of my improvement is to provide a screw specially adapted for following a bored hole and at the same time to furnish holding-threads for the entire length of the threaded portion.

Figure 7:
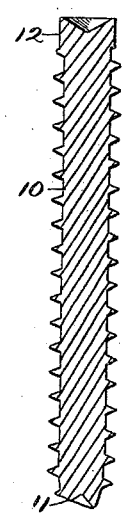
Figure 8:
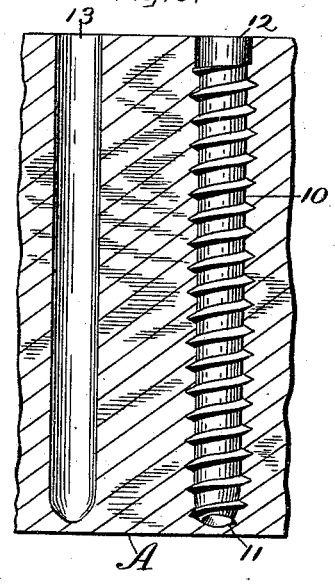
Figure 9:
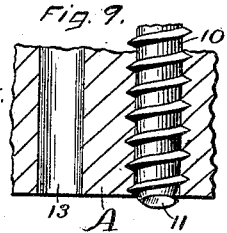

In the accompanying drawings, Figures 1, 2, 3, 4, 5, and 6 show side elevations of my screw with the head ends of different form. Fig. 7 is a longitudinal section of my screw with the head end in still another form. Fig. 8 illustrates in section a block of wood with two holes drilled in it, one hole having my screw inserted therein; and Fig. 9 illustrates a portion of another bored block and screw with the bore and screw extending through the block.

Figure 1:
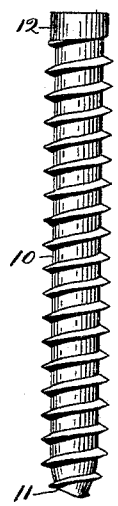
Figure 2:
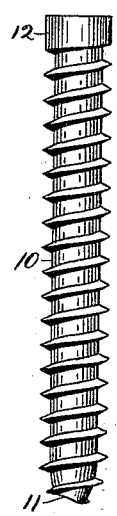
Figure 3:
Figure 4:
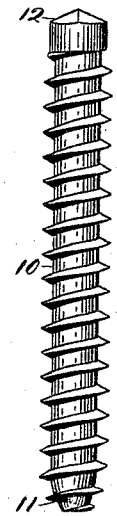
Figure 5:
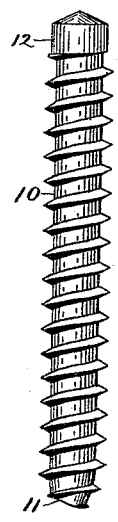
Figure 6:

10 designates the threaded body of my screw, 11 the partial or truncated point, and 12 the head end. I prefer to form these threads by rolling, but do not wish to limit my invention to a rolled screw-thread. When rolled from a blank which has not been enlarged, the diameter of the rolled thread will slightly exceed the diameter of the original stock at the head end 12, as shown in Figs. 1, 4, 5, 6, 7, and 8. In all of the screws except in Fig. 3 there is a short cylindrical portion at the head end 12, while in said Fig. 3 the threads extend the whole length of the screw. In Fig. 2 the short cylindrical portion at the head end is of the same diameter as the diameter of the thread, the same as in cut screws or in rolled screws made from a blank slightly enlarged at the head end before rolling the thread. In Figs. 1, 2, and 3 I have represented the head end as with a smooth unslotted face, that extends square across said end, while in Figs. 4, 5, 6, and 7 I have represented projecting and recessed faces at the head end.

In Fig. 8, A designates a piece of wood having a hole 13 bored therein for the reception of a screw and with a screw on the right-hand side of said block, that has been inserted in a similar hole. The screws with the heads having a face that is square across will be left flush with the surface of the wood, as shown in Fig. 8, while those having projecting or recessed faces at the head end will be left slightly projecting and the projecting portion dressed off to form a smooth flat face flush with the surface of the wood. These screws are to be inserted with a special tool or screw-driver, which is not a part of this invention.

In another application of even date herewith I have illustrated screws having their head ends and body the same as that herein shown and described, and therefore I do not claim the same in this application.

My present improvement relates to the partial or truncated point, and while it is particularly adapted for screws of this class it is applicable also to screws with heads of any kind whenever the screws are to be inserted within a bored hole. The core of the screw and the thread is somewhat tapered at the little end of the screw; but I prefer that the taper shall not extend so far down as to make the thread at the partial point or truncated end of a less diameter than the core of the screw, so that when the screw is inserted within a bored hole substantially the whole length of the thread will be forced into the wood with a holding effect. At the same time the slight taper in the thread and core of the screw is sufficient to properly guide the screw as it is screwed into the hole. Again, the small end of the screw may be forced in until it is near the surface of the wood on the side toward which it is screwed without pricking through the surface and with its holding-thread very near said surface, as shown in Fig. 8; or, in case it is desired to have the screw extend through said surface, as shown in Fig. 9, there is but little stock projecting to be dressed off.

Another advantage incidental to the manufacture of my screw when made by rolling is that it may be made from a cylindrical blank without previously pointing one end. This effects not only a saving in the labor of pointing the blanks, but by having the blanks precisely alike at both ends they are much more conveniently fed into the machine.

I claim as my invention—

1. A wood-screw consisting of a body and core having a short tapering partial or truncated point, and threads extending over the body and tapering truncated point of said core, substantially as described, and for the purpose specified.

2. A wood-screw having a body and a tapering partial or truncated point provided with a rolled thread extending over said body and point, substantially as described, and for the purpose specified.

3. A wood-screw for preventing fellies or analogous articles from splitting, consisting of a body and core having a short tapering partial or truncated point, screw-threads extending over said core and its point, and the head end, whose lateral projection does not exceed that of the thread, substantially as described, and for the purpose specified.

HORACE K. JONES.

Witnesses:
T. S. BISHOP,
M. S. WIARD.